Figure 1:
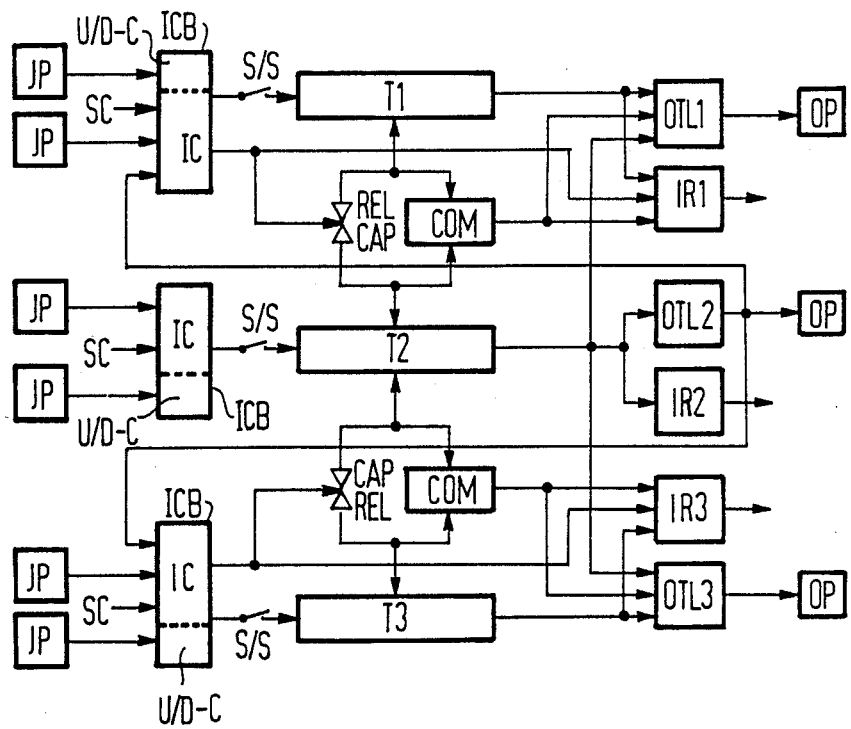

United States Patent [19]
Fleck et al.

[11] Patent Number: 4,942,559
[45] Date of Patent: Jul. 17, 1990

[54] COUNTER/TIMER CIRCUIT FOR A MICROCONTROLLER

[75] Inventors: Rod Fleck, Munich, Fed. Rep. of Germany; Mark Poret, Mesa, Ariz.; Karl-Heinz Mattheis, Forstinning, Fed. Rep. of Germany; Javier Magana, Austin, Tex.; Christoph Meinhold, Planegg, Fed. Rep. of Germany

[73] Assignees: Siemens Aktiengesellschaft, Munich, Fed. Rep. of Germany; Advanced Micro Devices Inc., Austin, Tex.

[21] Appl. No.: 376,857

[22] Filed: Jul. 7, 1989

[30] Foreign Application Priority Data

Jul. 8, 1988 [DE] Fed. Rep. of Germany ..... 23823235

[51] Int. Cl.⁵ .................. G04F 8/00; H03K 21/38
[52] U.S. Cl. .................... 368/113; 368/156; 377/44
[58] Field of Search .................. 368/107–113, 368/155, 156; 377/20, 27, 44; 364/569

[56] References Cited

U.S. PATENT DOCUMENTS 4,376,995 3/1983 Shimizu .................. 368/107
4,879,733 11/1989 Burch et al. .................. 377/44

Primary Examiner—Vit W. Miska
Attorney, Agent, or Firm—Herbert L. Lerner; Laurence A. Greenberg

[57] ABSTRACT

A counter/timer circuit for a microcontroller includes a central register and two auxiliary registers each having transfer outputs and counting inputs. Bistable output storage elements are each connected to a respective one of the transfer outputs. Interrupt request flags are also each connected to a respective one of the transfer outputs. Start/stop elements are each connected to a respective one of the counting inputs. Input control blocks are each connected to a respective one of the start/stop elements. First reload, capture and compare units are connected between one of the auxiliary registers and the central register, and second reload, capture and compare units are connected between the other of the auxiliary registers and the central register.

9 Claims, 1 Drawing Sheet

COUNTER/TIMER CIRCUIT FOR A MICROCONTROLLER

SPECIFICATION

The invention relates to a counter/timer circuit for a microcontroller that is integrated with the microcontroller.

The primary area where microcontrollers are used is in open and closed-loop control systems, where particular jobs must be processed under real-time conditions. In order for the processing to keep pace with the process to be controlled, the reaction of the microcontroller to process events must occur within certain maximum reaction times dictated by the particular process.

This means that a job step associated with a particular event must be processed completely before a further event can be allowed to occur, which in turn necessitates new processing of that job step as a reaction.

The processing speed of such a job by a microcontroller depends particularly, not only on the command throughput of the central unit of time, but also on the output capacity of the peripheral components that are also integrated into the system. In most cases, peripherals are the circuit elements additionally integrated on a chip along with the central processing unit, for instance for input/output or for counter and timer functions. Counter/timer circuits are used, for example, as real-time clocks, for counting internal and external events and for generating predetermined signals at particular times. Counter/timer circuits can also be used to generate or measure frequencies or pulses, these functions being performed largely independently of the work of the central processing unit.

Nearly all microcontrollers at present have one or more counter/timer structures, which are especially constructed for the various operating modes. Among the operating modes, distinctions are made between the following functions:

Clock modes:
A real time clock function is derived from the internal system clock rate.

Counter modes:
External events are counted.

Cascading modes:
A counter/timer structure is cascaded with a second counter/timer structure to make a structure of double register width, or one counter/timer structure is divided into two structures of one-half register width.

Upward/downward counting modes:
The counter/timer can be operated as both an upward and a downward counter.

Reload modes:
After the overflow of a counter/timer, or as the result of an external event, a value previously stored in a reload register is loaded into the counter/timer, to reestablish a defined offset state.

Capture modes:
The instantaneous contents of the counter/timer are stored in a buffer register, so that the current value can be detected without any interruption of the central processing unit and of the counter/timer circuits.

Compare modes:
The contents of the counter/timer are compared continuously with a compare register, and if the values are identical, a defined action of the counter/timer circuits takes place.

As a rule, all presently known counter/timer circuits can operate in various operating modes and have one or more reload, capture, or compare functions. Since these counter/timer circuits are usually predefined for particular tasks, there are relatively few options for modifying them.

The circuits known thus far have the following disadvantages for the customer and the manufacturer of microcontrollers:

The customer can use the counter/timer circuit only in the context of the predetermined functions. These restrictions mean that even though the necessary number of counter/timer circuits for performing a task may be available, the circuits still do not permit the required operating modes.

Since the integrated counter/timer circuits differ from one another by their varying layout for particular functions, each of these structures requires different treatment in programming.

For the manufacturer, every special counter/timer circuit must be developed separately, at enormous expense in terms of time and cost.

Thus no counter/timer circuits are known that make all of the above-named functions available to the customer and that would accordingly allow the customer to select the operating mode optimal for a particular task from the variety of functions offered by the counter/timer circuits.

It is accordingly an object of the invention to provide a counter/timer circuit for a microcontroller, which overcomes the above-mentioned disadvantages of the heretofore-known devices of this general type, which is easy to manufacture, and which can be used universally.

With the foregoing and other objects in view there is provided, in accordance with the invention, a counter/timer circuit integrated on a microcontroller chip, comprising a central register and two auxiliary registers each having transfer outputs and counting inputs, bistable output storage elements each being connected to a respective one of the transfer outputs, interrupt request flags each being connected to a respective one of the transfer outputs, start/stop elements each being connected to a respective one of the counting inputs, input control blocks each being connected to a respective one of the start/stop elements, first reload, capture and compare units connected between one of the auxiliary registers and the central register, and second reload, capture and compare units connected between the other of the auxiliary registers and the central register.

By structuring the counter/timer circuit as a central register plus two auxiliary registers, a standardized basic structure is assured, which permits the user to handle all three registers in the same way regardless of the particular job to be performed.

Another advantage of the invention is that the customer can optimally use the implemented counter/timer circuits for his own needs, without being confined by the manufacturer to a particular kind of function. On the other hand, less total space is occupied on the component, because the circuits are universally usable, and therefore it is no longer necessary for a plurality of structures, each with defined operating modes, to be implemented. Moreover, the manufacturer can react very quickly and flexibly to changing market requirements and, for instance, can manufacture microcontrollers with a plurality of identically constructed counter/timer circuits.

In accordance with another feature of the invention, the registers are programmable independently of one another.

In accordance with a further feature of the invention, each of the input control blocks include an input control circuit and upward/downward counting direction control means.

In accordance with an added feature of the invention, at least one of the input control circuits receives a system clock rate of the microcontroller.

In accordance with an additional feature of the invention, there are provided input pins of the microcontroller connected to the input control circuit and to the upward/downward counting direction control means.

In accordance with yet another feature of the invention, the input control blocks have inputs, the bistable output storage elements have outputs, and the output of the bistable output storage element connected to the central register is connected to the input of each of the input control blocks connected to the auxiliary registers.

In accordance with yet a further feature of the invention, the bistable output storage elements have inputs, and the transfer output of the central register is connected to the inputs of all of the bistable output storage elements.

In accordance with yet an added feature of the invention, the input control block connected to one of the auxiliary registers is connected directly to the interrupt request flag connected to the one auxiliary register, and the input control block connected to the other of the auxiliary registers is connected directly to the interrupt request flag connected to the other of the auxiliary registers.

In accordance with a concomitant feature of the invention, the input control block connected to one of the auxiliary registers is connected to the reload and capture units connected to the one auxiliary register, and the input control block connected to the other of the auxiliary registers is connected the reload and capture units connected to the other of the auxiliary registers.

Other features which are considered as characteristic for the invention are set forth in the appended claims.

Although the invention is illustrated and described herein as embodied in a counter/timer circuit for a microcontroller, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a block circuit diagram according to the invention, which will be explained below in terms of the various operating modes thereof.

Referring now to the single figure of the drawing in detail, there is seen one central register T2 and two auxiliary registers T1, T3, each of which are connected through a respective start/stop element S/S to a respective input control block ICB, which contains both an input control circuit IC and an upward/downward counter circuit U/D-C. The input control blocks ICB are supplied with a system clock rate SC and are connected to external circuits through input pins JP. The outputs of the registers T1, T2, T3 are each connected to an associated interrupt request flag IR1, IR2, IR3 and to a respective bistable output storage element OTL1, OTL2, OTL3.

The transfer output of the central register T2 is additionally connected to the bistable output storage elements OTL1, OTL3 of the auxiliary registers T1, T3. All three output storage elements OTL1, OTL2, OTL3 are connected to output pins OP of the microcontroller. The output of the bistable output storage element OTL2 of the central register T2 is additionally connected to the input control blocks ICB of the auxiliary registers T1, T3, while further outputs of these two input control blocks ICB are directly connected to the interrupt request flags IR1, IR3 of the associated auxiliary registers T1, T3 and to reload and capture units REL, CAP. The two auxiliary registers T1, T3 are connected to the central register T2 through the reload and capture units as well as compare units COM. The outputs of the compare units COM communicate with the interrupt request flags IR1, IR3 and the bistable output storage elements OTL1, OTL3 of the two auxiliary registers T1, T3.

The counter/timer circuit described above makes it possible to attain the following operating modes, with functions that are the same for all three registers being described first.

Timer mode:

The desired clock rate is generated from the system clock rate SC.

Controlled timer:

The clock rate is derived from the system clock rate SC as in the timer mode, and is switched ON or OFF by means of an external signal that is applied to the input pins JP.

Counter mode:

The clock rate is supplied from the outside through an input pin JP.

Selection options for the input clock rate:

In the input control block ICB, different input clock frequencies can be generated from the system clock rate SC by means of various divider factors. This is possible even when the circuit is operating in the controlled timer mode. If the input clock rate is derived from an external signal, then the input clock rate can be defined by either the positive, the negative or both edges of the external signal. Instead of introducing the internal system clock rate SC directly into the input control blocks ICB, this system clock rate can run through a separate pre-scale divider, which generates various frequencies that are then carried to the input control blocks ICB. There, one of these frequencies can then be selected for the timer mode.

Upward/downward counting direction:

The counting direction can be controlled both through a program (software) and through an external input signal.

Interrupt request function:

An internal interrupt request can be sent to the central unit through the interrupt request flags IR1, IR2, IR3 whenever the particular register T1, T2, T3 causes a counter overflow or underflow, that is whenever counting proceeds past the maximum displayable number or, in downward counting, when counting passes below zero.

Storage element function:

The bistable output storage elements OTL1, OTL2, OTL3 toggle their status each time there is an overflow or underflow of the particular register T1, T2, T3. The state of OTL1, OTL2, OLT3 can be transferred through the output pins OP to peripheral circuits, for instance.

Start/stop function:

The implied modification of the contents of the registers T1, T2, T3 by the operation of the counter/timer circuit can be started or stopped through the start/stop elements S/S.

Besides these operating modes, which can be set simultaneously and independently of one another for all three registers T1, T2 and T3, other operating modes are also possible in which each register can be configured depending on the selected operating mode of another register or of both of the other registers. Examples follow:

Controlled timer mode:

The timer functions of the auxiliary registers T1, T3 can be controlled through the output of the bistable output storage element OTL2.

Cascading mode:

The output signal of the output storage element OTL2 can be used in this case as the input signal for both auxiliary registers T1, T3 in the counting mode.

Capture mode:

In this case, the contents of the central register T2 are stored in one of the auxiliary registers T1, T3. This takes place either under program control by means of a command that uses one of the auxiliary registers T1, T3 as a destination operand, or by means of an external input signal. Additionally, the interrupt request flags IR1 or IR3 can be set.

Reload mode:

The central register T2 is loaded with the contents of one of the two auxiliary registers T1, T3 when either an overflow/underflow is present in the central register T2 or an external input signal is present, or if a transition occurs at the output of the output storage element OTL2 of the central register T2. Both an external input signal and a transfer of the output storage element OTL2 cause setting of the interrupt request flag IR1 or IR3.

Compare mode:

The contents of the central register T2 are compared continuously with the contents of the auxiliary register T1 or T3. If the contents agree, the corresponding output storage element OTL1 or OTL3 and the corresponding interrupt request flag IR1 or IR3 are set. An overflow/underflow of the central register T2 effects a reset of the output storage elements OTL1 or OTL3.

Accordingly, by means of the counter/timer circuit shown, the following functional modes are generally possible:

First, both the central register T2 and the two auxiliary registers T1, T3 can be programmed as independent counter/timers, and each register can count upward or downward independently and can generate an overflow/underflow signal as needed.

Second, each of the two auxiliary registers T1, T3 can be programmed as a reload, capture or compare register for the central register T2.

However, special functional modes are also possible, two of which will be described below:

For instance, the central register T2 in combination with one of the auxiliary registers T1 or T3 can form a 32-bit or 33-bit counter/timer register, even though the individual registers are only constructed for 16 bits. This is accomplished by switching the output of the bistable output storage element OTL2 to the counting input of one of the auxiliary registers T1 or T3, and the auxiliary registers T1, T3 is operated in the counter mode. The input of one auxiliary register T1 or T3 should be programmed in such a way that it reacts only to a positive or only to a negative edge of the signal emitted by the output storage element OTL2. The two registers connected in series with one another then form a 33-bit-wide counter/timer register (16 bits T2+1 bit OTL2+16 bits T1 or T3). However, if the input of one auxiliary register T1 or T3 is programmed in such a way that it reacts to both a positive and a negative edge of the signal emitted by the output storage element OTL2, then the two coupled registers form a 32-bit counter/timer register, since the corresponding auxiliary register is incremented upon each status transition of the output storage element OTL2.

A further highly advantageous operating mode deals with using the reload modes of the auxiliary registers to generate pulse-width-modulated signals; the reload operation is triggered by either only a positive or only a negative edge at the output of the output storage element OTL2. A variant of this function is to operate only one of the two auxiliary registers T1 or T3 in the reload mode. In this way, the contents of the central register T2 are changed only every other period. If both auxiliary registers T1 and T3 are used as reload registers, then the auxiliary registers can be programmed in such a way that upon each positive edge of the output signal from the output storage element OTL2, the central register T2 is loaded from one auxiliary register, and upon every negative edge of the output signal the central register T2 is loaded from the other auxiliary register. The central register T2 is thus loaded in alternation from the auxiliary register T1 or the auxiliary register T3. While one register for instance specifies the duration of a HIGH state, the other register can determine the duration of a LOW state. In both of these operating modes, the output signal, which is pulse-width-modulated in this way, can be picked up at the output pin OP of the output storage element OTL2.

The foregoing is a description corresponding in substance to German Application No. P 38 23 235.9, dated July 8, 1988, the International priority of which is being claimed for the instant application, and which is hereby made part of this application. Any material discrepancies between the foregoing specification and the aforementioned corresponding German application are to be resolved in favor of the latter.

We claim:

1. Counter/timer circuit for a microcontroller, comprising a central register and two auxiliary registers each having transfer outputs and counting inputs, bistable output storage elements each being connected to a respective one of said transfer outputs, interrupt request flags each being connected to a respective one of said transfer outputs, start/stop elements each being connected to a respective one of said counting inputs, input control blocks each being connected to a respective one of said start/stop elements, first reload, capture and compare units connected between one of said auxiliary registers and said central register, and second reload, capture and compare units connected between the other of said auxiliary registers and said central register.

2. Counter/timer circuit according to claim 1, wherein said registers are programmable independently of one another.

3. Counter/timer circuit according to claim 1, wherein each of said input control blocks includes an input control circuit and upward/downward counting direction control means.

4. Counter/timer circuit according to claim 3, wherein at least one of said input control circuits receives a system clock rate of the microcontroller.

5. Counter/timer circuit according to claim 3, including input pins of the microcontroller connected to said input control circuit and to said upward/downward counting direction control means.

6. Counter/timer circuit according to claim 1, wherein said input control blocks have inputs, said bistable output storage elements have outputs, and said output of said bistable output storage element connected to said central register is connected to said input of each of said input control blocks connected to said auxiliary registers.

7. Counter/timer circuit according to claim 1, wherein said bistable output storage elements have inputs, and said transfer output of said central register is connected to said inputs of all of said bistable output storage elements.

8. Counter/timer circuit according to claim 1, wherein said input control block connected to one of said auxiliary registers is connected directly to said interrupt request flag connected to said one auxiliary register, and said input control block connected to the other of said auxiliary registers is connected directly to said interrupt request flag connected to the other of said auxiliary registers.

9. Counter/timer circuit according to claim 1, wherein said input control block connected to one of said auxiliary registers is connected to said reload and capture units connected to said one auxiliary register, and said input control block connected to the other of said auxiliary registers is connected to said reload and capture units connected to the other of said auxiliary registers.

* * * * *